United States Patent [19]

Hughes

[11] 4,316,970

[45] Feb. 23, 1982

[54] BLENDS OF BUTENE-1-ETHYLENE COPOLYMER AND POLYPROPYLENE

[75] Inventor: Patrick M. Hughes, Houston, Tex.

[73] Assignee: Shell Oil Company, Houston, Tex.

[21] Appl. No.: 174,482

[22] Filed: Aug. 1, 1980

[51] Int. Cl.$^3$ .................... C08L 23/20; C08L 23/12
[52] U.S. Cl. ........................................... 525/240
[58] Field of Search ............................... 525/240, 211

[56] References Cited

U.S. PATENT DOCUMENTS

| | | | |
|---|---|---|---|
| 3,440,208 | 4/1969 | Foglia et al. | 260/41 |
| 3,634,551 | 1/1972 | Stancell et al. | 260/897 A |
| 3,634,552 | 1/1972 | Foglia et al. | 260/897 A |
| 3,634,553 | 1/1972 | Foglia et al. | 260/897 A |
| 3,684,760 | 8/1972 | Goldbach et al. | 260/31.2 R |
| 3,808,304 | 4/1974 | Schirmer | 264/289 |
| 3,836,607 | 9/1974 | Finkmann et al. | 260/897 A |
| 4,075,290 | 2/1978 | Denzel et al. | 260/897 A |
| 4,136,501 | 1/1979 | Connolly | 53/461 |
| 4,169,910 | 10/1979 | Graboski | 428/35 |

FOREIGN PATENT DOCUMENTS 695803 9/1967 Belgium.

OTHER PUBLICATIONS

Witco Chemical Polymer Division Polybutylene Brochure, 4 pp., (1977).
Abstract of Netherlands 6707690 12/4/67.

*Primary Examiner*—Carman J. Seccuro

[57] ABSTRACT

A heat sealable blend of a butene-1-ethylene copolymer and about 2 to 9% by weight of polypropylene can be used to form film exhibiting improved heat sealing characteristics, processability, tear strength and other properties.

4 Claims, 5 Drawing Figures

BLENDS OF BUTENE-1-ETHYLENE COPOLYMER AND POLYPROPYLENE

BACKGROUND OF THE INVENTION

This invention relates to heat-sealable blends of butene-1-ethylene copolymer and polypropylene. More particularly, the invention is directed to blends of butene-1-ethylene copolymer and about 2 to 9% by weight of polypropylene, which may be used to form film exhibiting improved heat sealability, processability and other properties.

A plastic film suitable for use in the fabricating of bags, shipping sacks and other items must possess a variety of good physical and mechanical properties. For example, it is advantageous if heat sealing of layers of the film may be conducted over a broad range of sealing temperatures while obtaining good seal strengths. It is also advantageous for the film to be strongly resistant to tearing and to exhibit good tensile strength. To be favorable economically, the film should be readily processable at high production speeds (line speeds) and an increase in film gauge should not be required to maintain satisfactory physical and mechanical properties.

As is known to those skilled in the art, heat seals between layers of butene-1 polymers have an unsatisfactory seal strength. Incorporating a small amount of low density polyethylene (LDPE) into polybutylene (PB), as disclosed in U.S. Pat. no. 3,634,551, improves heat seal strength somewhat. However, blends of a butene-1 polymer and LDPE form films which are not rapidly processable and have been found to require heat sealing over a relatively narrow range of temperatures. LDPE film itself, which enjoys wide commercial use, may be processed at higher production rates but has been found to exhibit low tear strength.

It has now been discovered that a blend of butene-1-ethylene copolymer and about 2 to 9% by weight of polypropylene may be used for the production of film with an excellent overall balance of properties and which overcomes many of the problems with the aforementioned prior art films.

U.S. Pat. No. 3,808,304 discloses heat sealable polypropylene/polybutylene blends, but obtains maximum seal strengths at polypropylene levels ranging from about 20 to 89% by weight. This high level of polypropylene addition may be expected to adversely affect other film properties, such as tear strength.

U.S. Pat. No. 4,075,290 discloses heat sealable blends of 80 to 99% by weight of polybutylene and 1 to 20% by weight of polypropylene. The disclosure, however, restricts the polybutylene component to butene-1 homopolymers and sets forth limited ranges of physical properties for both the polybutylene and polypropylene components.

SUMMARY OF THE INVENTION

This invention is directed to a composition consisting essentially of a blend of about 91 to 98% by weight of an isotactic butene-1-ethylene copolymer and about 2 to 9% by weight of polypropylene. This invention is also directed to a heat sealable film consisting essentially of the aforementioned blend of a butene-1-ethylene copolymer and polypropylene.

Films and the like manufactured from the compositions of the invention exhibit unexpected improvements in heat seal strength, tear strength, tensile strength, clarity and other properties. The film may be heat sealed over a broad temperature range and at temperatures generally lower than film formed from blends of butene-1-ethylene copolymers and LDPE (BE/LDPE film). Furthermore, the film may be processed economically on conventional equipment at rates approaching or exceeding those for LDPE itself; the improved properties may also permit a decrease in the film gauge.

DETAILED DESCRIPTION

Figure 1:
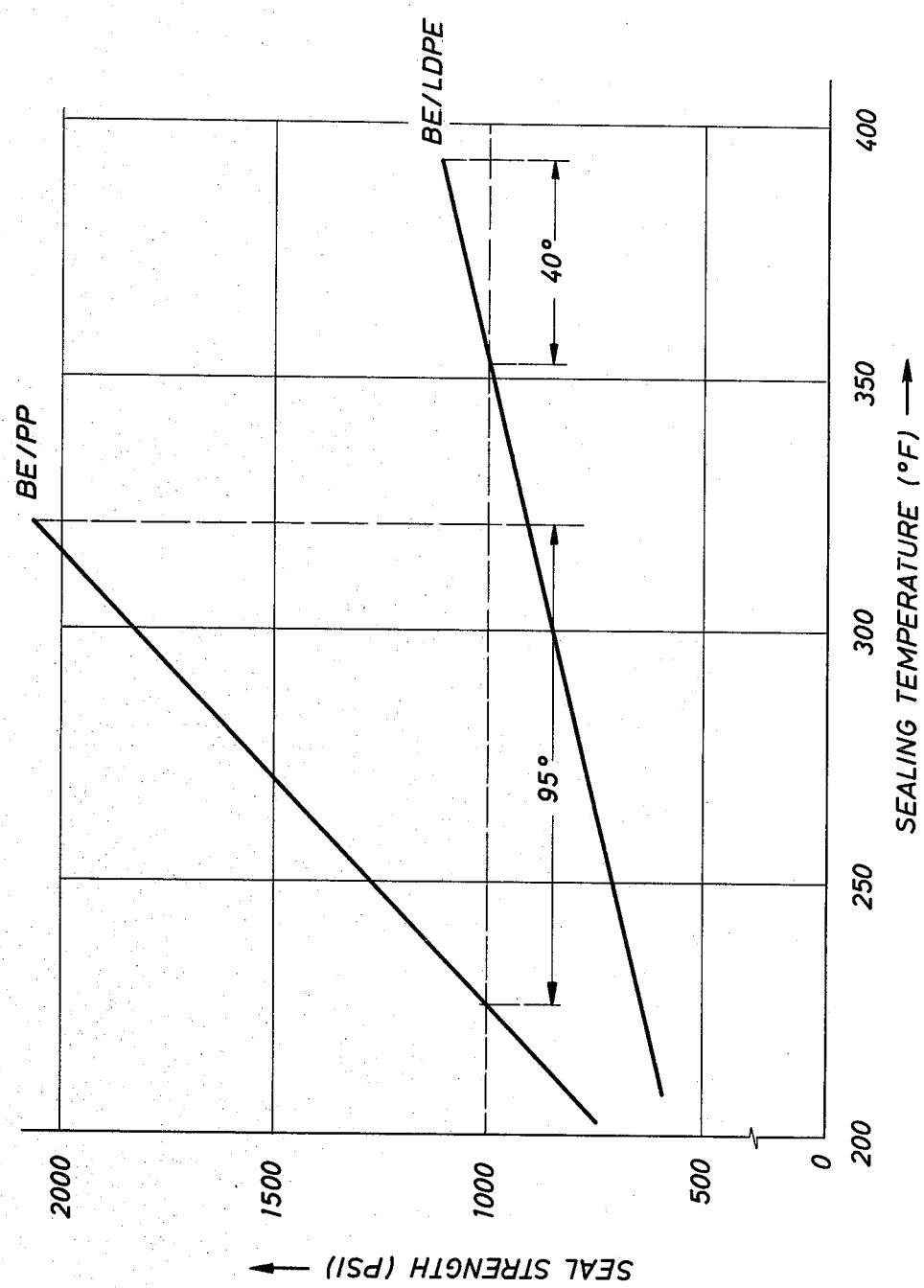
FIG. 1 is a graphic representation of the heat seal strengths at various temperatures for butene-1-ethylene copolymer blends.

The copolymer used in the composition is suitably an isotactic thermoplastic butene-1-ethylene copolymer with a melt index of from about 0.5 to 3.5, preferably about 0.8 to 2.0 and more preferably about 0.9 to 1.1, as measured by ASTM D1238, Condition E. It will be understood by one skilled in the art that the melt indices and molecular weights of the butene-1-ethylene copolymers are related; the corresponding molecular weight for a copolymer with a given melt index may be readily determined by routine experimentation. A particularly suitable copolymer, for example, has a melt index of 1.0 and a weight average molecular weight (determined by gel permeation chromatography) of about 400,000. Suitable butene-1-ethylene copolymers contain from about 0.5 to 10 mole percent, preferably about 0.5 to 5 mole preferably about 1 to 2 mole percent of ethylene. It will be further understood by one skilled in the art that the ethylene contents and densities of the butene-1-ethylene copolymers are related; the corresponding density for a copolymer with a given ethylene contact may also be determined by routine experimentation. A particularly suitable copolymer, for example, has an ethylene content of 1.5 mole percent and a density of 0.908 grams/cm$^3$. The term "isotactic" butene-1-ethylene copolymer, as used herein, refers to a copolymer containing at least 90%, preferably at least 95% and more preferably at least 98% by weight, of isotactic portions, determined as the diethyl ether insoluble component. Methods for preparing the copolymers are well known in the art. The preferred copolymers are commercially available.

The polypropylene blended with the butene-1-ethylene copolymer is suitably isotactic propylene homopolymer. A polypropylene with a melt flow of from about 1 to 10, as measured by ASTM D1238, Condition L, is typically employed. It will be understood by one skilled in the art that the melt flows and molecular weights of the polypropylenes are related; the corresponding molecular weight for a polymer with a given melt flow may be readily determined by routine experimentation. A particularly suitable polypropylene, for example has a melt flow of 5, a weight average molecular weight (determined by gel permeation chromatography) of about 335,000 and a density of 0.902 grams/cm$^3$. A polypropylene with a viscosity at mixing temperatures approximating that of the butene-1-ethylene copolymer is preferred, in order to facilitate intimate mixing in conventional extrusion compounding equipment. This may be accomplished, for example, by blending the aforementioned particularly suitable butene-1-ethylene copolymer having a melt index of 1.0 (2.4 melt flow) with the aforementioned 5 melt flow polypropylene. A wide variety of suitable polypropylenes are commercially available and methods for their preparation are well known in the art.

The amount of polypropylene blended with the butene-1-ethylene copolymer is critical. The compositions of the invention contain from about 2 to 9% by weight, preferably about 4 to 8% by weight and more preferably about 6% by weight, of polypropylene. It will be understood that polypropylene addition at certain levels within the range described may optimize certain properties but not others; the preferred level of about 6% polypropylene represents the level at which the compositions exhibit the best overall improved property balance. Selection of the actual level of polypropylene will therefore depend in part on the end use contemplated for the composition. It will be further understood that, in some cases, compositions with polypropylene levels of up to about 14% by weight may exhibit similarly improved properties. Furthermore, one skilled in the art would realize that the actual property values determined herein for the blends of the invention and conventional LDPE and BE/LDPE blends are dependent on actual conditions of operation, equipment used and other factors, and can therefore vary considerably. The compositions are typically formulated by mixing, e.g. tumbling, pellets of each component and extruding the mixture. If desired, various conventional fillers, stabilizers, processing agents, slip agents, antiblock agents, nucleating agents, pigments and/or other additives may be incorporated in the polymers before, during or after the blending operation. It will be understood by one skilled in the art that the effect of various additives on certain properties of the composition may or may not make their presence desirable, depending in part on the contemplated end use. For example, the presence of certain slip agents, while desirable in compositions used for such products as compression wrap, may adversely affect the seal strength of the composition and may therefore be undesirable for use in certain other products, e.g. heavy duty bags, where seal strength is a primary consideration.

After blending, the compositions of the invention can be formed on conventional manufacturing equipment, e.g. blown film equipment. Cold air (typically about 20° to 40° F.) is optionally and preferably blown on the bubble as it exits from the blown film die to expedite processing. The compositions can be formed into a variety of shapes with cross-sectional thicknesses (gauge) of, for example, about 0.5 to 30 mils. Typical shapes include oriented or unoriented flat or tubular films or sheets, which can be used for wrappings, bags, packages, lay flat irrigation tubing, inflatable dunnage bags and other items. The compositions can be used as replacements for conventional LDPE or BE/LDPE films or sheets in many applications. The superior overall property balance of the present compositions often makes possible a reduction in gauge of up to one-third or more over the corresponding LDPE products; a gauge reduction serves to reduce processing times and the amount of material required per product, and is therefore economically desirable. However, even without such a reduction in gauge, the present compositions can be manufactured (processed) into film and the like at rates exceeding those for BE/LDPE blends and, when cold air is blown on the bubble, at rates approaching or exceeding these for LDPE itself. If the compositions are manufactured into film on conventional blown film machines, a blow up ratio (bubble diameter:die diameter) of from about 1.0 to 4.0, more preferably about 2.4 to 3.0, is typically employed.

After manufacture (processing) into film and the like, compositions according to this invention can be fabricated into final products on conventional fabrication equipment, which can be of the in-line or out-of-line variety. With typical in-line equipment, which is more economical to use and used by a majority of the industry, a film is passed directly after its manufacture to the fabrication equipment, e.g. heat sealing machine, used for fabricating into a final product. With typical out-of-line equipment, a film is first stored and not passed directly to the fabrication stage; at least in the case of butene-1 polymers, the film is typically aged in excess of ten days to allow for the crystalline transformation of the polymer from what is known in the art as Form II to the more stable Form I. Heat sealing may be accomplished by conventional means, for example hot wire, bar and dielectric machines. While heat sealing conditions will depend on various factors such as gauge (thickness) and the machine used, heat sealing temperature is generally about 225° to 425° F. All else being equal, the film may be sealed at lower temperatures and over a broader temperature range than conventional BE/LDPE film, while affording products with excellent seal strength. This allows fabrication of the present compositions on existing industrial equipment adapted for use with LDPE films; a broad sealing temperature range eliminates the need for precise control, otherwise undersirable and difficult to achieve in an industrial setting, of the sealing temperatures employed.

The compositions according to the invention also exhibit excellent tear strength. Tear strength is related in part to the rate (line speed) at which the material is processed; materials processed at higher rates typically exhibit decreased tear strengths. The present compositions, even when processed at rates exceeding those for conventional BE/LDPE and approaching or exceeding those for conventional LDPE, exhibit tear strengths substantially above those for the conventional materials. The teat strength of polypropylene itself is below that of a typical butene-1 polymer; nevertheless, the present compositions consisting essentially of a butene-1 polymer and polypropylene exhibit superior tear strengths. The tensile stress at break of the film itself is also higher for the present compositions than for conventional BE/LDPE. In addition, the clarity of compositions according to this invention is improved over the clarity of conventional BE/LDPE and approaches the clarity of LDPE.

The invention is illustrated further in the following examples, which are not to be construed as limiting its scope. In the examples, the materials tested are denoted as follows:

BE/PP—blend according to the invention of butene-1-ethylene copolymer (1.5 mole % ethylene, 1.0 melt index, 98% isotactic, 0.908 g/cm³); 6% w propylene homopolymer (5 melt flow, 0.902 g/cm³, molecular weight of 334,500); and minor amounts of fatty acid amide slip agent, silica antiblock agent and hindered phenolic thermal-oxidative stabilizer;

BE/LDPE—blend of butene-1-ethylene copolymer (as above); 8% w low density polyethylene (2.1 melt index, 0.924 g/cm³); and minor amounts of slip agent, antiblock agent and stabilizer (as above);

LDPE—low density polyethylene (as above) and minor amounts of fatty acid amide slip agent, silica antiblock agent and hindered phenolic thermal-oxidative stabilizer.

The melt index and melt flow were measured by ASTM D1238, Conditions E and L, respectively. The seal strength (tensile stress of seal at break) was measured by sealing two strips of film to each other and subjecting to tension perpendicular to the seal (ASTM D882) until a break occurred. The tear strength (Elmendorf tear) was measured by ASTM D1922. The impact strength of the seal (dart drop) was measured by ASTM D1709, Method A (50% failure). The tensile stress at break of the film was measured by ASTM D882. The blends were manufactured into film using cold air blown on the bubble exiting from the blown film die.

EXAMPLE I

In this series of experiments, the seal strengths of the BE/PP blend (according to the invention) and the conventional BE/LDPE blend were determined at various sealing temperatures. The blends had been manufactured into 2 mil film on conventional equipment at 36 feet/minute using a blow up ratio of 2.7, and subsequently heat sealed on conventional in-line equipment. The results, plotted with the use of standard linear regression techniques, are shown in FIG. 1. The maximum sealing temperature shown for each blend was the highest temperature attainable without burn-through. A minimum desired seal strength of 1000 psi is assumed and represented by a horizontal dashed line on FIG. 1. The figure shows that the BE/PP film according to the invention can be heat sealed at lower sealing temperatures (below 315° F.) and over a broader range of sealing temperatures (95° F.) than the conventional BE/LDPE film, while maintaining a seal strength of 1000 psi or above. The BE/PP film also exhibited better clarity than the BE/LDPE film. Similarly tested LDPE film would be expected to show sealing temperatures below about 350° F. and a heat sealing range of about 100° F.

EXAMPLE II

Figure 2:
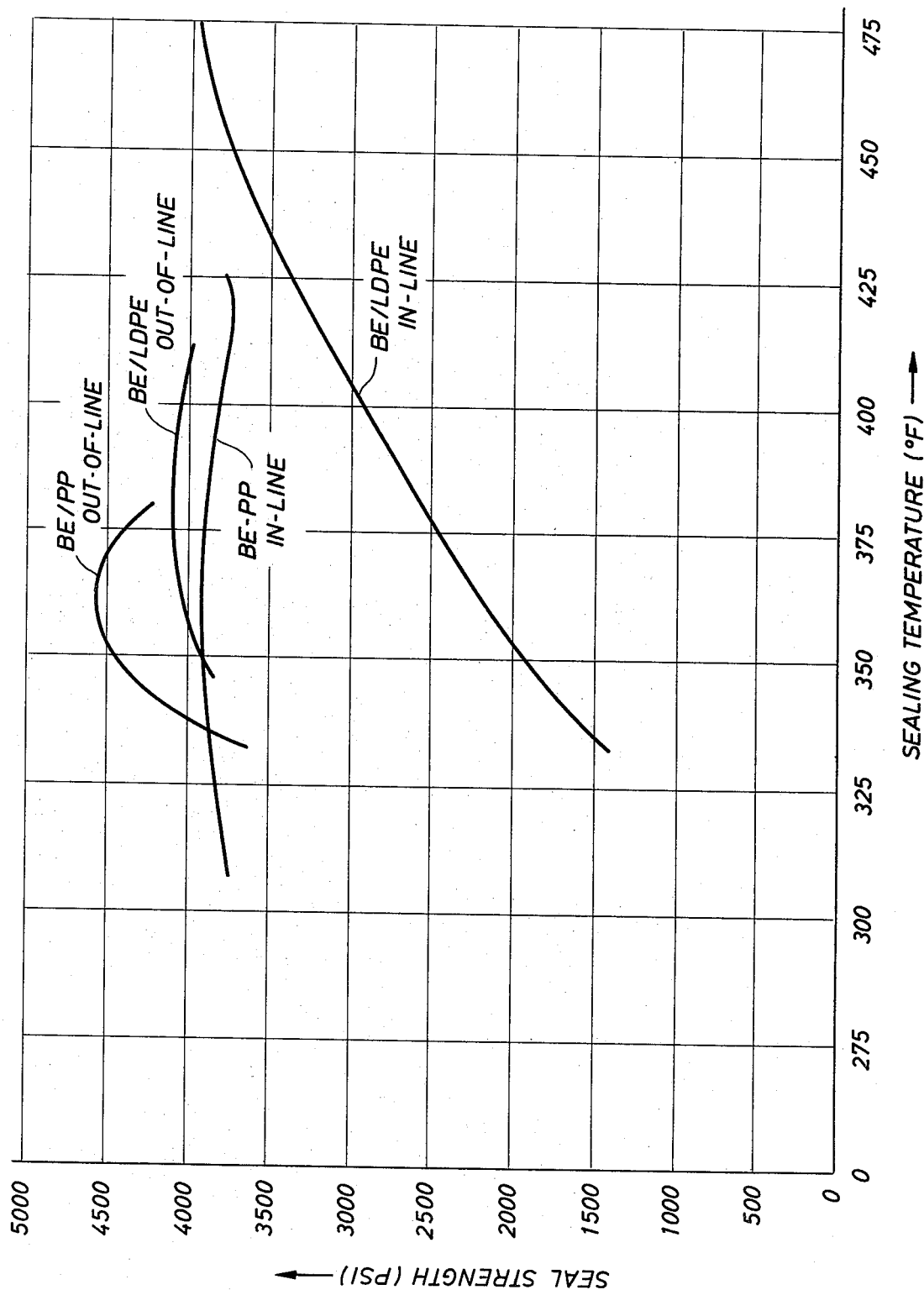
FIG. 2 is a graphical representation of the heat seal strengths at various sealing temperatures for butene-1-ethylene copolymers blends sealed on in-line and out-of-line fabrication equipment.

In this series of experiments, the seal strengths of the BE/PP blend (according to the invention) and the conventional BE/LDPE blend were determined at various sealing temperatures on Sheldahl B308 out-of-line and Gloucester 418 in-line heat sealing machines. The blends had been manufactured into 2 mil film on conventional equipment. The BE/PP blends were processed at 53 feet/minute using a blow up ratio of 2.8, and the BE/LDPE blends were processed at 36 feet/minute using a blow up ratio of 2.8. The results are shown in FIG. 2. It may be observed that the BE/PP and BE/LDPE films give roughly equivalent seal strengths for the sealing temperatures tested, when fabricated on the out-of-line equipment. However, when fabricated on in-line equipment, the BE/PP film according to the invention gives higher seal strengths than the BE/LDPE film, at least for the lower end of sealing temperatures which are of greater interest. It will be recalled that in-line equipment is used by a majority of the industry and avoids the need for aging to allow for the crystalline transformation of the butene-1 polymer. The BE/PP film also exhibited better clarity than the BE/LDPE film.

EXAMPLE III

Figure 3:
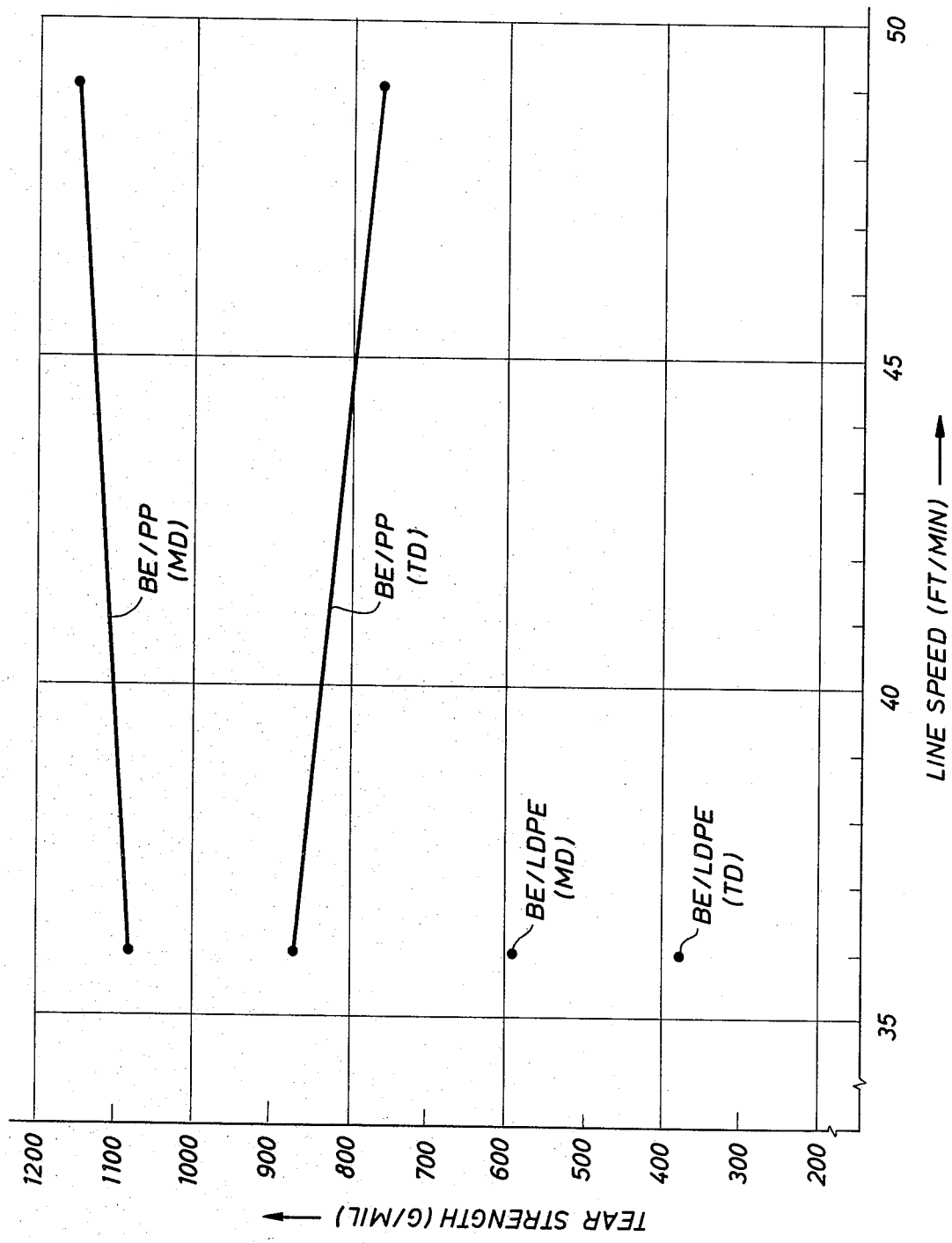
FIG. 3 is a graphical representation of the tear strength at various production rates for butene-1-ethylene copolymer blends.

In this series of experiments, the tear strengths in both the machine direction (MD) and transverse direction (TD) were determined for the BE/PP and BE/LDPE blends at various line speeds. The blends had been manufactured into 2 mil film at the stated line speeds on conventional equipment using a blow up ratio of 2.7. The results are shown in FIG. 3. The BE/PP film according to the invention can be run at higher line speeds while giving higher tear strength in both directions than the conventional BE/LDPE film. In addition, the tear strength of the BE/PP film is in general not highly affected by changes in line speed; this will allow for faster processing and greater utility of the BE/PP film to the industry. The BE/PP film also exhibited better clarity than the BE/LDPE film.

EXAMPLE IV

Figure 4:
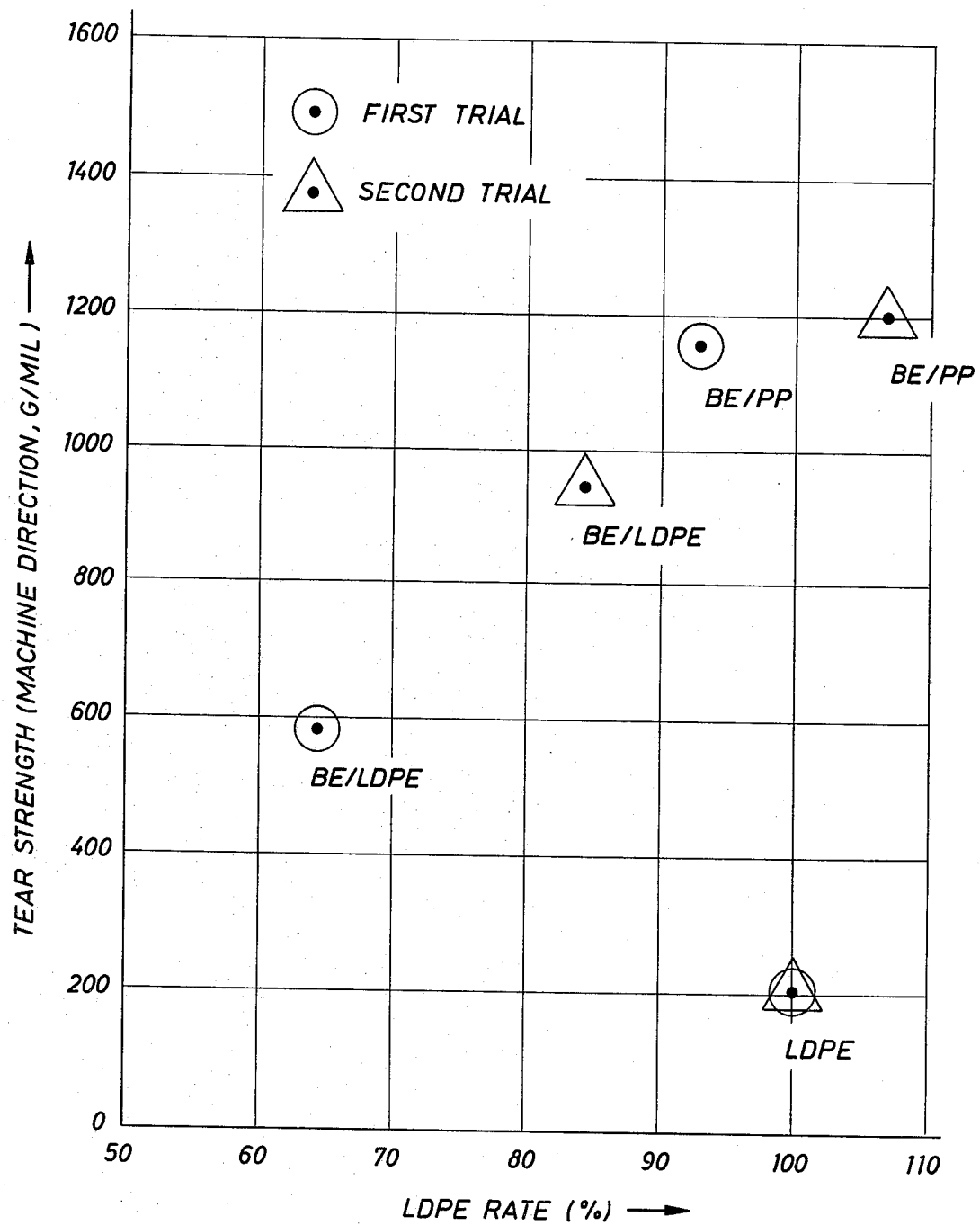
FIG. 4 is a graphical representation of the tear strength at various percentages of the LDPE production rate for butene-1-ethylene copolymer blends and LDPE.

In this series of experiments, the tear strength in the machine direction of 4 mil LDPE film was determined at a given processing rate (in pounds per linear inch of die). The values for LDPE and the tear strengths (in machine direction at the maximum line speeds tested) of the 2 mil BE/PP and BE/LDPE films of Example III, at processing rates expressed in terms of the percentage of the LDPE rate (LDPE=100%), are shown as circular points of FIG. 4. Similar values from a separate trial of 4 mil BE/LDPE and BE/PP films are also shown in FIG. 4, using triangular points; the LDPE film rate is again shown as 100%, although the absolute values for the LDPE rates differed between the trials. The BE/PP films according to the invention showed higher tear strengths than either the BE/LDPE or LDPE films in both trials, even when run at rates approaching or exceeding the LDPE rates. The BE/PP films also exhibited better clarity than the BE/LDPE film and clarity approaching that of the LDPE film.

EXAMPLE V

Figure 5:
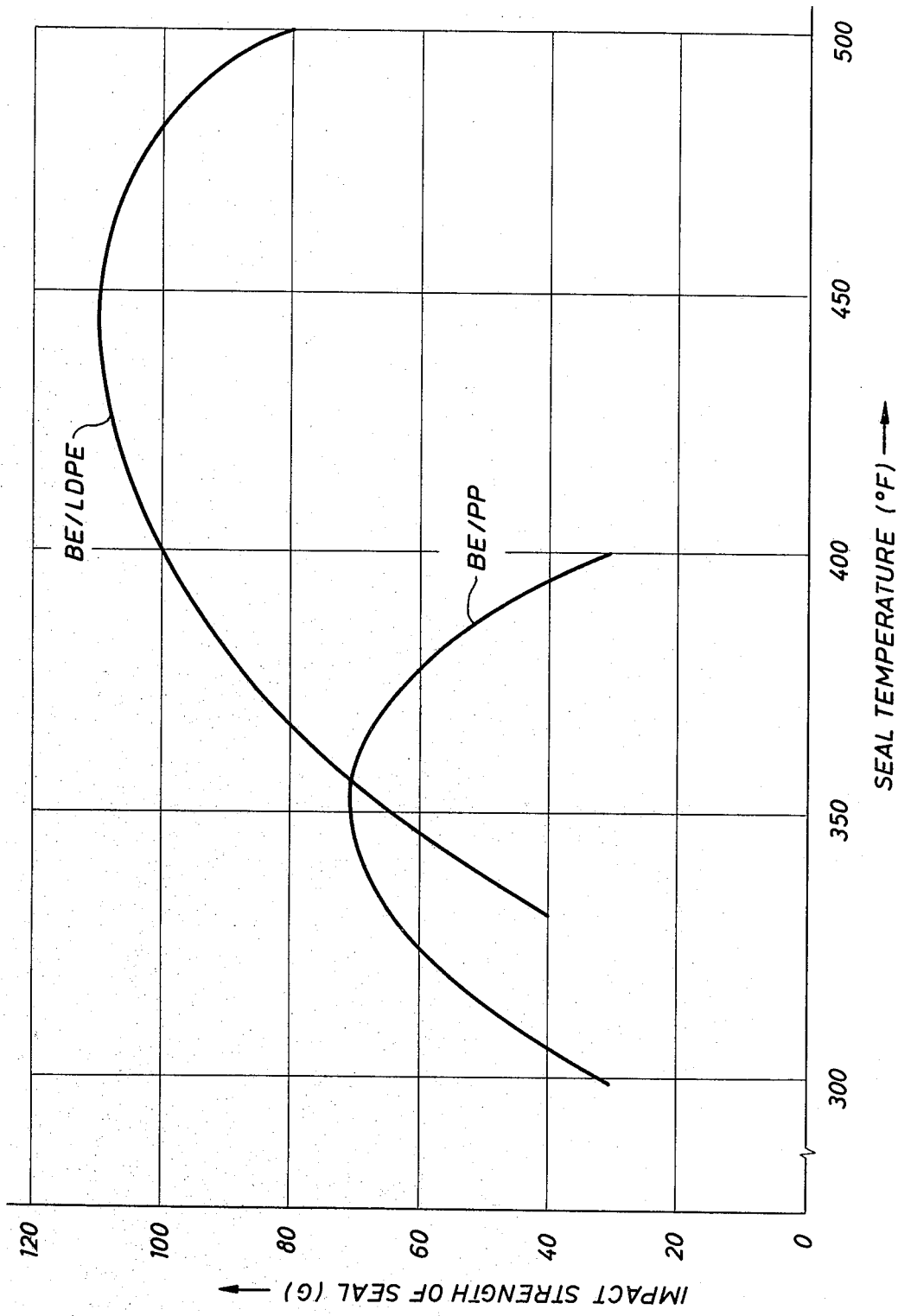
FIG. 5 is a graphical representation of the impact strength of the seal at various heat sealing temperatures for butene-1-ethylene copolymer blends.

The impact strength (dart drop) of the seal was determined for BE/PP and BE/LDPE blends sealed at various sealing temperatures on an in-line heat sealing machine. The blends had been manufactured into 2 mil film on conventional equipment. The BE/PP blends were processed at 53 feet/minute using a blow up ratio of 2.8, and the BE/LDPE blends were processed at 36 feet/minute using a blow up ratio of 2.8. The results, shown in FIG. 5, demonstrate that the BE/PP film according to the invention, fabricated on in-line equipment, affords lower seal impact strengths than conventional BE/LDPE film, when sealing temperatures above approximately 350° F. are employed. It will be recalled, however, that lower sealing temperatures are of greater interest to the industry.

EXAMPLE VI

The tensile stress of the film at break was determined for BE/PP and BE/LDPE blends. The blends had been manufactured into 2 mil film on conventional equipment. The BE/PP blends were processed at 53 feet/minute using a blow up ratio of 2.8, and the BE/LDPE blends were processed at 36 feet/minute using a blow up ratio of 2.8. The results, shown in Table I, demonstrate that the BE/PP films according to the invention exhibit better tensile stress at break, in the machine direction, than conventional BE/LDPE film.

TABLE I

| Sample | Tensile Stress of Film at Break (psi) | |
|---|---|---|
| | Machine Direction | Transverse Direction |
| BE/LDPE | 7010 | 5700 |
| BE/PP | 7540 | 5530 |
| BE/PP | 8110 | 5120 |

What is claimed is:

1. A film or sheets consisting essentially of a blend of about 92-94% by weight of an isotactic butene-1-ethylene copolymer containing 0.5 to 10 mole percent of ethylene and about 6-8% by weight of isotactic polyproylene.

2. A film or sheets consisting essentially of a blend of about 94% by weight of an isotactic butene-1-ethylene copolymer containing 0.5 to 10 mole percent of ethylene and about 6% by weight of isotactic polypropylene.

3. A heat sealable blown film consisting essentially of about 92-94% by weight of an isotactic butene-1-ethylene copolymer containing 0.5 to 10 mole percent of ethylene and about 6-8% by weight of isotactic polypropylene.

4. A heat sealable blown film consisting essentially of about 94% by weight of an isotactic butene-1-ethylene copolymer containing 0.5 to 10 mole percent of ethylene and about 6% by weight of isotactic polypropylene.

* * * * *